US008781031B2

(12) United States Patent
Casagrande (10) Patent No.: US 8,781,031 B2
(45) Date of Patent: Jul. 15, 2014

(54) LOW RATE, DIRECT CONVERSION FSK RADIO-FREQUENCY SIGNAL RECEIVERS

(75) Inventor: Arnaud Casagrande, Bole (CH)

(73) Assignee: The Swatch Group Research and Development Ltd., Marin (CH)

( * ) Notice: Subject to any disclaimer, the term of this patent is extended or adjusted under 35 U.S.C. 154(b) by 355 days.

(21) Appl. No.: 13/210,699

(22) Filed: Aug. 16, 2011

(65) Prior Publication Data

US 2012/0045023 A1   Feb. 23, 2012

(30) Foreign Application Priority Data

Aug. 18, 2010 (EP) .................................... 10173249

(51) Int. Cl.
*H03D 3/00* (2006.01)
(52) U.S. Cl.
USPC ............................ 375/334; 375/335; 375/336
(58) Field of Classification Search
USPC ......................................... 375/334–337, 316
See application file for complete search history.

(56) References Cited

U.S. PATENT DOCUMENTS

| 4,321,549 | A |   | 3/1982 | Hansen |         |
|-----------|---|---|--------|--------|---------|
| 5,293,408 | A | * | 3/1994 | Takahashi et al. | 375/349 |
| 2006/0088126 | A1 | * | 4/2006 | Puma | 375/302 |
| 2006/0109127 | A1 |   | 5/2006 | Barink et al. | |

FOREIGN PATENT DOCUMENTS

| JP | 2003-333116 | 11/2003 |
| WO | WO 2006/055403 A1 | 5/2006 |
| WO | WO 2009/066558 A1 | 5/2009 |

OTHER PUBLICATIONS

European Search Report issued Jan. 13, 2011, in European Application No. 10173249, filed Aug. 18, 2010 (with English Translation of Category of Cited Documents).

* cited by examiner

*Primary Examiner* — Sam K Ahn
*Assistant Examiner* — Janice Tieu
(74) *Attorney, Agent, or Firm* — Oblon, Spivak, McClelland, Maier & Neustadt, L.L.P.

(57) ABSTRACT

The receiver (1) picks up low rate FSK radio frequency signals. This receiver includes an antenna (2) for receiving FSK radio frequency signals, a low noise amplifier (3) connected to the antenna, a local oscillator (7) for supplying oscillating signals (LO), a phase shift circuit (16) for performing a 0° to 90° phase shift, and vice versa, in the oscillating signals (LO) or the incoming FSK radio frequency signals in each semi-period of a phase switching cycle (1/fs). The phase shift circuit alternately and successively generates in-phase and quadrature oscillating signals, or in-phase and quadrature incoming FSK radio frequency signals. The receiver includes a single mixer (4) for mixing the oscillating signals successively with the incoming FSK radio frequency signals, so as to generate alternately intermediate in-phase and quadrature baseband signals (INT) as a function of the phase shift circuit. The receiver further includes a low-pass filter (8) for filtering the intermediate in-phase and quadrature signals, and a demodulation stage (20) for demodulating the data ($D_{OUT}$) from the filtered intermediate signals. The receiver is arranged such that the phase shift circuit (16) is switched by a phase selection signal (SEL) to a phase switching cycle frequency (fs) which is lower than the frequency deviation ($\Delta f$) of the modulated data in the FSK radio frequency signals and higher than the data rate frequency. Magic circuits (14, 15) in the demodulation stage reconstruct the intermediate signals during each switch operation for continuous demodulation in the demodulator (12).

17 Claims, 8 Drawing Sheets

Fig. 7

LOW RATE, DIRECT CONVERSION FSK RADIO-FREQUENCY SIGNAL RECEIVERS

This application claims priority from European Patent Application No. 10173249.3 filed Aug. 8, 2010, the entire disclosure of which is incorporated herein by reference.

FIELD OF THE INVENTION

The invention concerns a low rate and direct conversion radio frequency signal receiver for FSK modulation.

BACKGROUND OF THE INVENTION

Figure 1A:
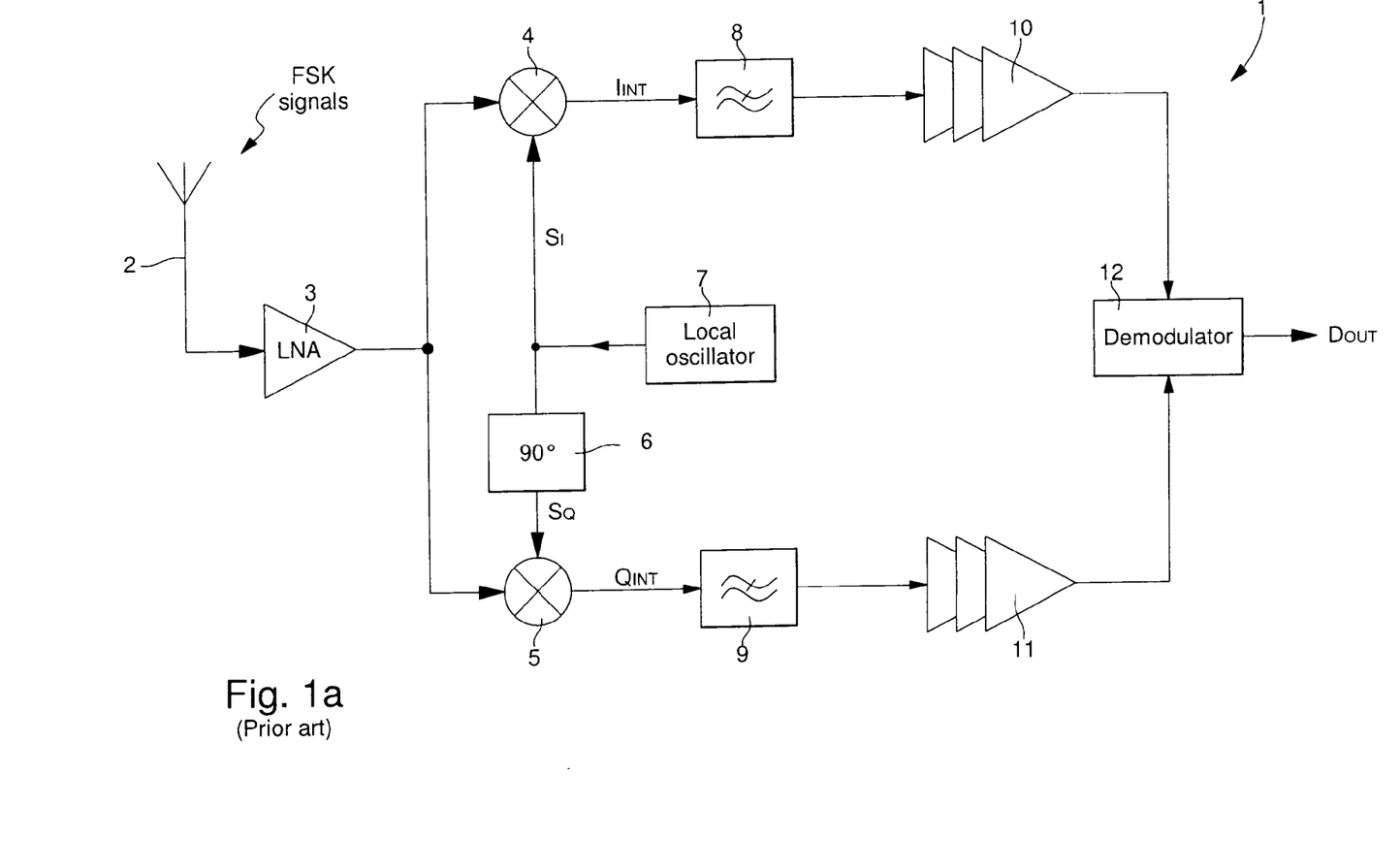
FIGS. 1a and 1b cited above show a simplified view of two embodiments of an FSK radio frequency receiver according to the prior art.

In a conventional radio frequency signal receiver for FSK modulation, as shown in FIG. 1a, direct frequency conversion can be carried out in two distinct quadrature branches to obtain baseband signals. Each branch includes a mixer 4, 5 for performing the frequency conversion with oscillating signals supplied by a local oscillator 7. In a first branch, a first high frequency mixer 4 mixes the FSK signals picked up by the antenna 2 and amplified by the low noise amplifier ("LNA") 3 of the receiver, with in-phase oscillating signals $S_I$ to provide intermediate in-phase signals $I_{INT}$. In a second branch, a second high frequency mixer 5 mixes the FSK signals picked up by antenna 2 and amplified by the LNA 3, with quadrature oscillating signals $S_Q$ to provide intermediate quadrature signals $Q_{INT}$. These quadrature oscillating signals are obtained via a 90° phase shifter 6 connected to local oscillator 7. The intermediate signals $I_{INT}$ and $Q_{INT}$ are then each filtered in a respective low-pass filter 8 and 9 to provide filtered signals. The filtered signals then each pass through a respective limiter 10 and 11 prior to data demodulation in the conventional demodulator 12, which provides data signals $D_{OUT}$. The two intermediate in-phase signals $I_{INT}$ and quadrature signals $Q_{INT}$ are necessary for the demodulation stage to be able to identify the sign of the incoming FSK signal frequency drift and to analyse the incoming FSK signal data.

Figure 1B:
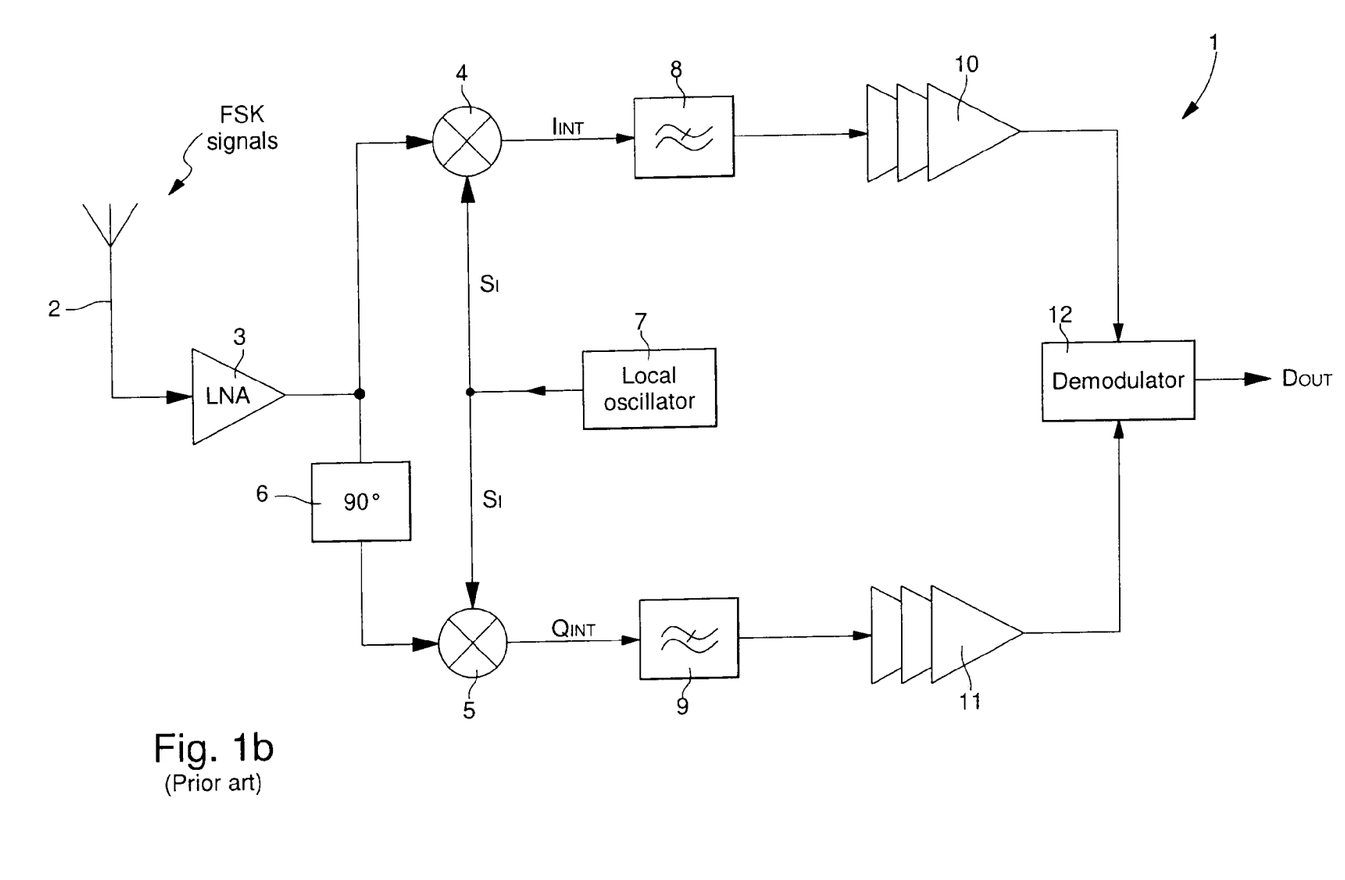

According to another variant of a conventional FSK radio frequency signal receiver shown in FIG. 1b, a 90° phase shifter 6 may be provided in one of the branches prior to frequency conversion. The FSK radio frequency signals are mixed, firstly, in the first high frequency mixer 4 via oscillating signals $S_I$ provided by local oscillator 7, so as to provide intermediate in-phase signals $I_{INT}$. The FSK radio frequency signals phase-shifted by 90° by phase shifter 6 are then mixed in the second high frequency mixer 5 via the same oscillating signals $S_I$ from local oscillator 7, so as to provide the intermediate quadrature signals $Q_{INT}$.

According to the first and second variants set out above with reference to FIGS. 1a and 1b, receiver 1 may be capable of picking up conventional FSK radio frequency signals, which may have a carrier frequency $f_0$ of around 2.45 GHz. A data modulation frequency drift or deviation of $+\Delta f$ or $-\Delta f$ around $f_0$ may be around ±250 kHz, or lower. Since high frequency direct conversion is carried out in the two mixers 4 and 5, followed by filtering in the two low-pass filters and amplitude limiting in two limiters, the receiver consumes a high level of electric power, which is a drawback.

To avoid the use of two mixers during the high frequency direct conversion of the incoming radio frequency signals, reference may be made to U.S. Pat. No. 5,293,408, which discloses an FSK data signal receiver. This receiver has a single mixer for the direct conversion of the incoming FSK signals into baseband signals. To achieve this, according to a first variant, oscillating signals from a local oscillator are supplied to the single mixer via a phase control circuit, which acts alternately during phase switching, like a 90° phase shifter. The phase control circuit supplies alternately over time in-phase oscillating signals and quadrature oscillating signals to the single mixer to convert the frequency of the FSK radio frequency signals picked up by the receiver antenna. The intermediate signals supplied by the mixer are thus a series of alternate intermediate in-phase signals and intermediate quadrature signals. These intermediate signals are filtered in a low-pass filter prior to a data demodulation operation.

According to a second variant of the FSK radio frequency signal receiver, the phase control circuit, which acts alternately during phase switching as a 90° phase shifter, is arranged between the receiver antenna and the single mixer. This phase control circuit supplies alternately over time in-phase FSK radio frequency signals and quadrature FSK radio frequency signals to the mixer. The local oscillator directly supplies oscillating signals to the mixer so that it provides alternate intermediate in-phase and quadrature signals. These intermediate signals are also filtered by a low-pass filter prior to a data demodulation operation.

In the FSK signal receiver of U.S. Pat. No. 5,293,408, switching between the in-phase signals and quadrature signals by the phase control circuit is carried out very abruptly. This leads to high frequencies. In these conditions, because very rapid switching is required, a low-pass filter with a very broad bandwidth is needed after the single mixer, which is a drawback. This also means that the FSK signal receiver has low practical sensitivity and poor reception channel efficiency, but high electric power consumption. This receiver can only be used for controlling equipment in a precise place, but not in a communication universe with several transmission and reception channels. Moreover, the phase control circuit for changing from in-phase signals to quadrature signals and vice versa is directly controlled on the basis of first baseband signals at the low-pass filter output. Switching with very steep flanks occurs from one phase to another, which requires the use of lag components. Thus all the spurious frequencies on the central frequency pass through the filter to maintain rapid switching between the phases. These spurious frequencies may even be higher than the frequency of the incoming radio frequency signals, which leads to high power consumption in the receiver input stage.

U.S. Pat. No. 6,038,268 disclosing an FSK radio frequency signal receiver may also be cited. This receiver also uses a single mixer for converting the frequency of the radio frequency signals into baseband signals. A phase control circuit is provided at the local oscillator output to supply in-phase or quadrature signals to the mixer. A pulse control generator is provided for clocking the phase control circuit at the local oscillator output. As for the preceding document, the first low-pass filter at the mixer output has a very high bandwidth, given that phase switching must also be very rapid. This is a drawback, since second low-pass filters with a narrow bandwidth must also be provided before the data demodulation phase to remove all of the spurious frequencies, which have not been filtered out by the first low-pass filter. High power consumption in the input stage, notably the phase control circuit, is thus observed, and additional components are provided between the frequency conversion and data demodulation, which is another drawback.

SUMMARY OF THE INVENTION

It is thus an object of the invention to provide a direct conversion radio frequency signal receiver for FSK modulation, which has a high level of sensitivity in a low rate mode and low power consumption, to overcome the aforementioned drawbacks of the state of the art.

A low rate radio frequency signal receiver for FSK modulation, said low power receiver including:
- an antenna for receiving FSK radio frequency signals,
- a low noise amplifier for amplifying and filtering the signals picked up by the antenna,
- a local oscillator for supplying oscillating signals having a substantially identical frequency to the carrier frequency of the incoming FSK radio frequency signals,
- a phase shift circuit for performing a 0° to 90° phase shift and vice versa in the oscillating signals or the incoming FSK radio frequency signals, in each semi-period of a phase switching cycle, so as to generate, alternately and successively, in-phase and quadrature oscillating signals, or in-phase and quadrature incoming FSK radio frequency signals,
- a mixer for successively mixing the in-phase and quadrature signals with the filtered and amplified incoming FSK radio frequency signals, or the oscillating signals with the in-phase and quadrature FSK radio frequency signals, so as to generate alternately intermediate in-phase and quadrature baseband signals,
- at least one low-pass filter for filtering the intermediate in-phase and quadrature signals, and
- a demodulation stage for demodulating the data from the filtered intermediate in-phase and quadrature signals, wherein the receiver is arranged such that the phase shift circuit is switched by a phase selection signal to a phase switching cycle frequency which is lower than the frequency deviation of the modulated data in the FSK radio frequency signals and higher than the data rate.

Specific embodiments of the receiver are defined in the dependent claims 2 to 14.

One advantage of the radio frequency signal receiver for FSK data modulation according to the invention lies in the fact that phase switching is performed at a low frequency compared to the data modulation frequency drift in the incoming FSK radio frequency signals. However, the phase switching frequency is higher than the data rate frequency in said FSK radio frequency signals. The data modulation frequency deviation is thus much higher than the low data rate of the intermediate signals to be demodulated, which guarantees that a narrow band low-pass filter can be used. As a result of the low frequency phase switching of the FSK signal receiver and the single mixer for frequency conversion, the electric power consumption of the receiver is greatly reduced. Also, the much slower phase switching does not impair data demodulation in the demodulation stage.

Another advantage of the FSK radio frequency signal receiver according to the invention lies in the fact that in the demodulation stage, the selected intermediate in-phase and quadrature signals are reconstructed in each branch when the other branch is selected to facilitate demodulation in the demodulator.

BRIEF DESCRIPTION OF THE DRAWINGS

The objects, advantages and features of the FSK radio frequency receiver will appear more clearly in the following description, given on the basis of non-limiting embodiments illustrated by the drawings, in which.

DETAILED DESCRIPTION OF THE INVENTION

In the following description, all those components of the radio frequency signal modulation receiver (FSK) that are well known to those skilled in the art in this technical field will be described only in a simplified manner. Said FSK radio frequency signal receiver is mainly provided for performing direct conversion of the low data rate radio frequency signals into baseband signals via a single mixer.

Figure 2A:
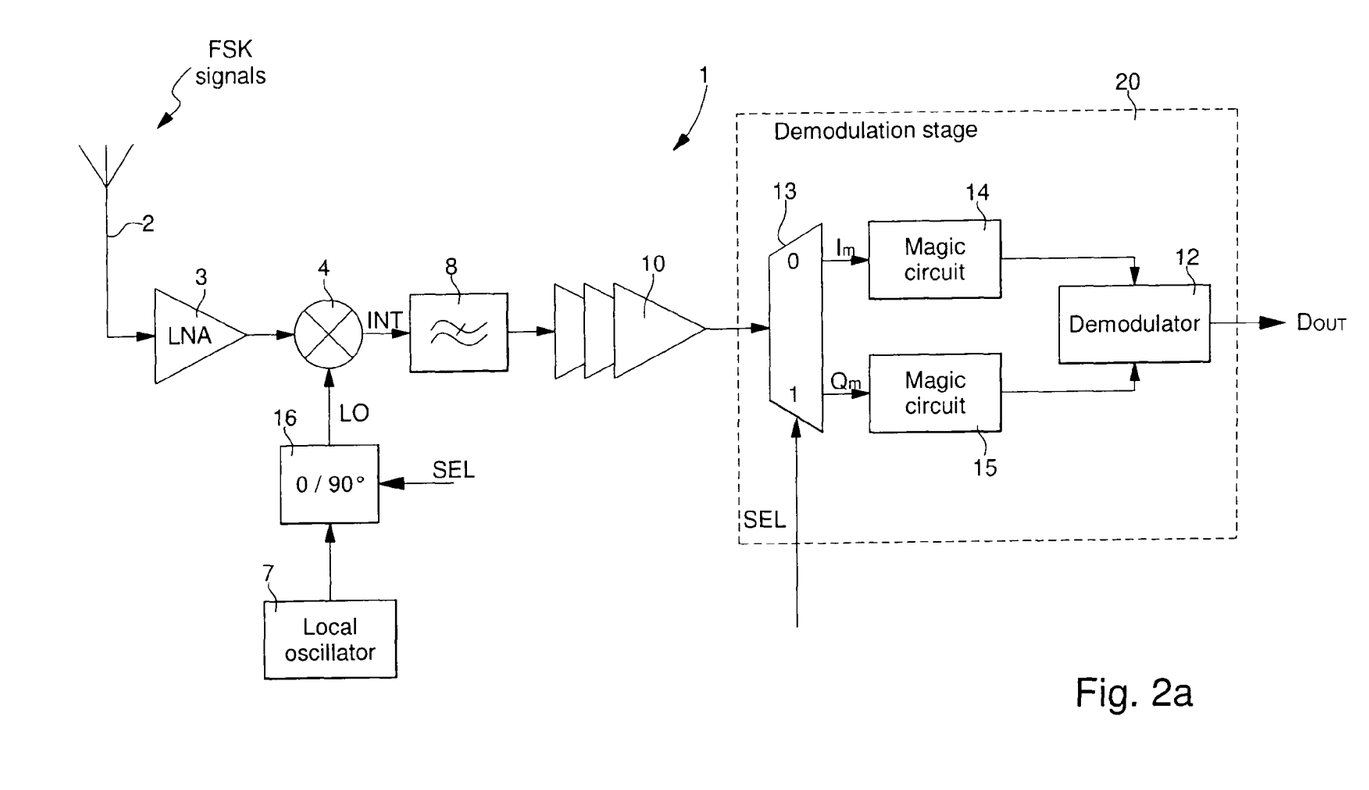
FIGS. 2a and 2b show a simplified view of two embodiments of a direct conversion, low rate, FSK radio frequency signal receiver according to the invention.
Figure 2B:
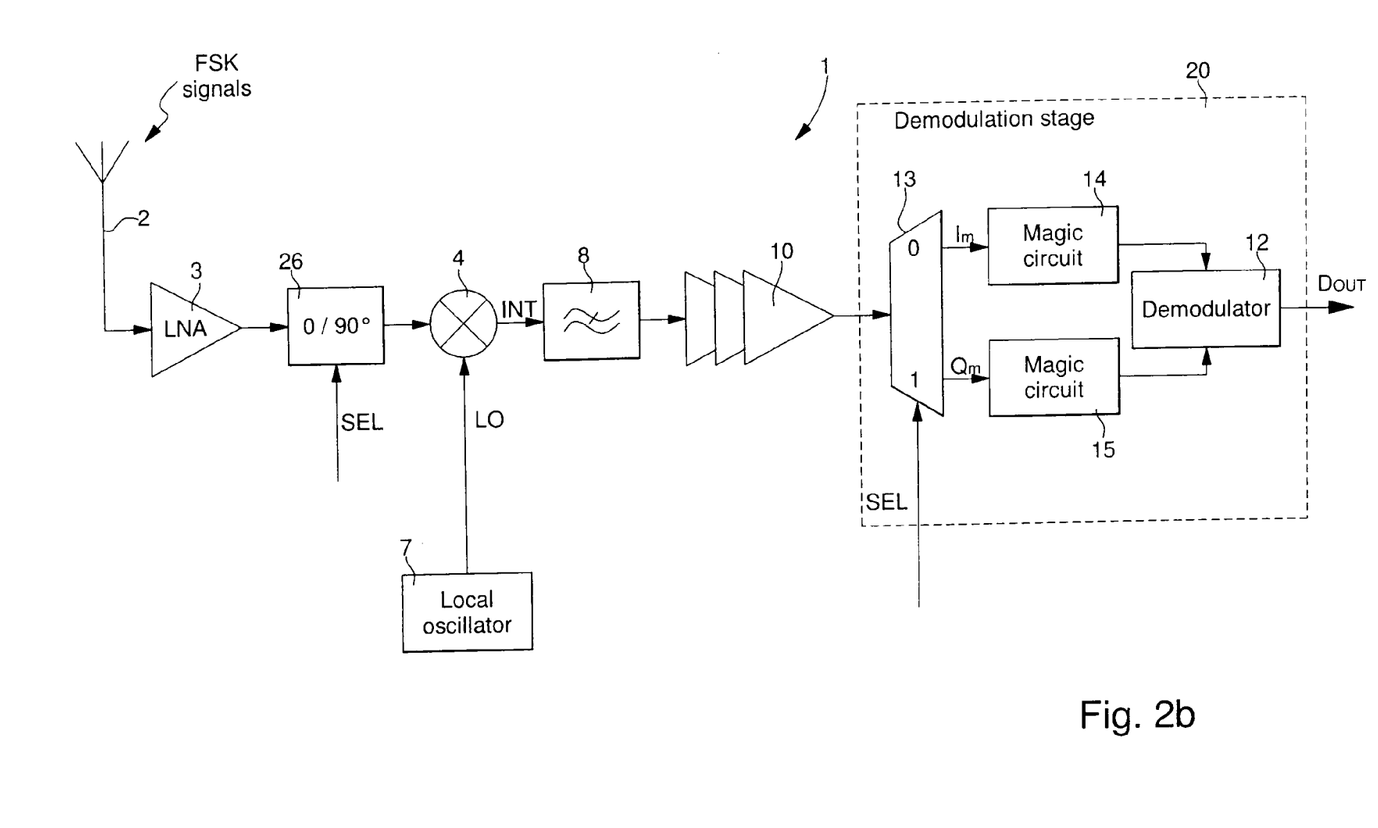

The FSK radio frequency signal receiver 1, shown in FIGS. 2a and 2b, is configured to be able to operate in a low rate data or control reception mode. This modulated data or control rate in the FSK signals is thus lower than 10 kbits/s, for example around 1 kbits/s. In these conditions, the power of the radio frequency signals picked up by an antenna 2 of receiver 1 is generally concentrated on the (positive and negative) modulation frequency shift or deviation $\Delta f$ relative to carrier frequency $f_0$ of the FSK signals. This carrier frequency $f_0$ may be higher than 300 MHz, for example around 2.45 GHz. The modulation frequency shift or deviation must theoretically be high enough, for example higher than or equal to 100 kHz, and preferably to 250 kHz, to avoid being influenced by the high level of noise 1/f close to 0 Hz after frequency conversion. Generally, in the incoming signal frequency modulation, a "1" modulation state is defined by adding the carrier frequency $f_0$ to the modulation frequency shift $\Delta f$, which gives $f_0+\Delta f$, whereas a "0" modulation state is defined by subtracting modulation frequency shift $\Delta f$ from the carrier frequency $f_0$, which gives $f_0-\Delta f$. Of course, it is possible to envisage defining the "0" modulation state as the carrier frequency $f_0$, although the data modulation frequency of $f_0+\Delta f$ and $f_0-\Delta f$ is preferred.

A first embodiment of the FSK radio frequency signal receiver 1 is shown in FIG. 2a. The receiver of FIG. 2a includes first of all, an FSK radio frequency signal receiver antenna 2 and an LNA 3 for conventional amplification and filtering of the FSK signals. The receiver also includes a local oscillator 7 for providing oscillating signals LO to a phase shift circuit 16. The oscillating signals LO are generated with an equivalent frequency to the carrier frequency $f_0$ of the incoming FSK signals. Phase shift circuit 16 is controlled by a phase selection signal SEL so as to phase shift from 0° to 90° or vice versa the oscillating signals LO supplied by local oscillator 7 in each semi-period of a switching cycle 1/fs. This enables a single mixer 4 to be supplied alternately with in-phase oscillating signals and quadrature oscillating signals, which are phase shifted 90° relative to the in-phase oscillating signals.

The in-phase oscillating signals are, for example, supplied when the signal SEL is in a "0" state, whereas the quadrature oscillating signals are, for example, supplied when the signal SEL is in a "1" state. However, the reverse selection by signal SEL may also be envisaged. The frequency of phase switching cycle fs is devised to be lower than the frequency deviation Δf but much higher than the frequency of the modulated data rate D in the FSK radio frequency signals. The frequency of switching cycle fs may be set at 10 to 20 times lower than the frequency deviation Δf, for example between 10 and 25 kHz, whereas the frequency deviation Δf may be between 100 and 250 kHz. The phase switching cycle frequency fs is however 10 to 20 times higher than the frequency of the modulated data rate D, and the modulated data rate D is for example 1 kbits/s.

An incoming FSK signal frequency conversion is thus performed in mixer 4 via the oscillating signals in order to supply intermediate baseband signals INT. Since the oscillating signals LO, which are supplied to mixer 4, are alternately and successively in-phase oscillating signals and quadrature oscillating signals, the intermediate signals INT produced at the output of the single mixer 4 are alternately and successively intermediate in-phase and quadrature signals.

These intermediate signals INT are then filtered by a low-pass filter 8, which may have a low bandwidth given that receiver 1 is configured to receive low rate FSK radio frequency signals, and that the phase switching frequency is advantageously low. The filtered intermediate signals INT are also amplified in an amplitude limiter 10 before entering a demodulation stage 20. On the basis of the filtered and amplified intermediate signals, this demodulation stage is capable, after demodulation, of supplying data signals $D_{OUT}$ at output. These data signals $D_{OUT}$ can be used immediately by a processing unit (not shown), for example for controlling the functions of an instrument in which the receiver is placed.

The demodulation stage 20 input includes a demultiplexer 13, which receives the filtered and amplified intermediate signals INT. This demultiplexer 13 is controlled by the phase selection signal SEL so as to provide the selected intermediate in-phase signals Im at a first output, when signal SEL is in the "0" state, and the selected quadrature intermediate signals Qm at a second output, when signal SEL is in the "1" state. Since phase switching is performed relatively slowly at a switching cycle frequency fs for example equal to 10 kHz, this does not lead to high spurious frequencies, such as jitters, during phase switching. Only switching transients appear, but at a low frequency, which does not impair data demodulation.

Since demultiplexer 13 supplies the intermediate in-phase signals Im cyclically in a time lag 1/(2·fs) and the intermediate quadrature signals Qm in a successive time period 1/(2·fs), "holes" remain in the signals in each demodulation branch at the demultiplexer output. This therefore reduces the size and power consumption of the receiver relative to a conventional receiver with two conversion branches, but it also reduces the sensitivity of the receiver by approximately 3 dB, which is not detrimental. However, in order to allow continuous data demodulation in demodulation stage 20, first and second circuits called "magic circuits" 14 and 15 are used in each respective branch.

A first magic circuit 14 receives the selected intermediate in-phase signals Im, whereas a second magic circuit 15 receives the selected intermediate quadrature signals Qm. The task of each magic circuit is to reconstruct the in-phase Im or quadrature Qm signals in the pause times of each branch as a function of the phase selection signal SEL. Each magic circuit 14, 15 thus takes the image of the incoming signals to reconstruct said signals on that basis for the entire duration of the pause before new in-phase signals Im or quadrature signals Qm are supplied via the demultiplexer, controlled by the phase selection signal SEL. As a result of these magic circuits, the selected intermediate in-phase signals Im and quadrature signals Qm are continuously supplied, which is essential, to a data demodulator at the demodulation stage output.

Each magic circuit 14, 15 advantageously comprises a well-known pseudo digital phase lock loop (PLL), which continuously generates the in-phase signals Im or quadrature signals Qm representing the received signals prior to selection of the other branch. In the phase of acquisition of the selected intermediate signals Im or Qm at the demultiplexer 13 output via selection signal SEL, a magic circuit counter, which is clocked by a clock in the receiver, measures the mean period of said intermediate signals received prior to cut off. The clock frequency may, for example, be around 26 MHz. On the basis of this measurement, the digital PLL (NCO synthesiser) which is clocked by the receiver clock, is frequency adjusted once per switching operation and started with a phase equal to the mean measured phase. A register of each digital PLL can thus store the phase and frequency of the received signals for generating image signals of the received signals prior to the pause or cut off moments. Demodulator 12 thus continuously receives intermediate in-phase and quadrature signals Im and Qm.

Demodulator 12 of demodulation stage 20 may be a simple D flip-flop, which receives, for example at the D input, the intermediate in-phase signals Im and is clocked at the clock terminal CLK thereof by the intermediate quadrature signals Qm. With this flip-flop and depending upon the state of each data bit, the flip-flop output is at level 1 or level 0 in data signals $D_{OUT}$.

Figure 3:
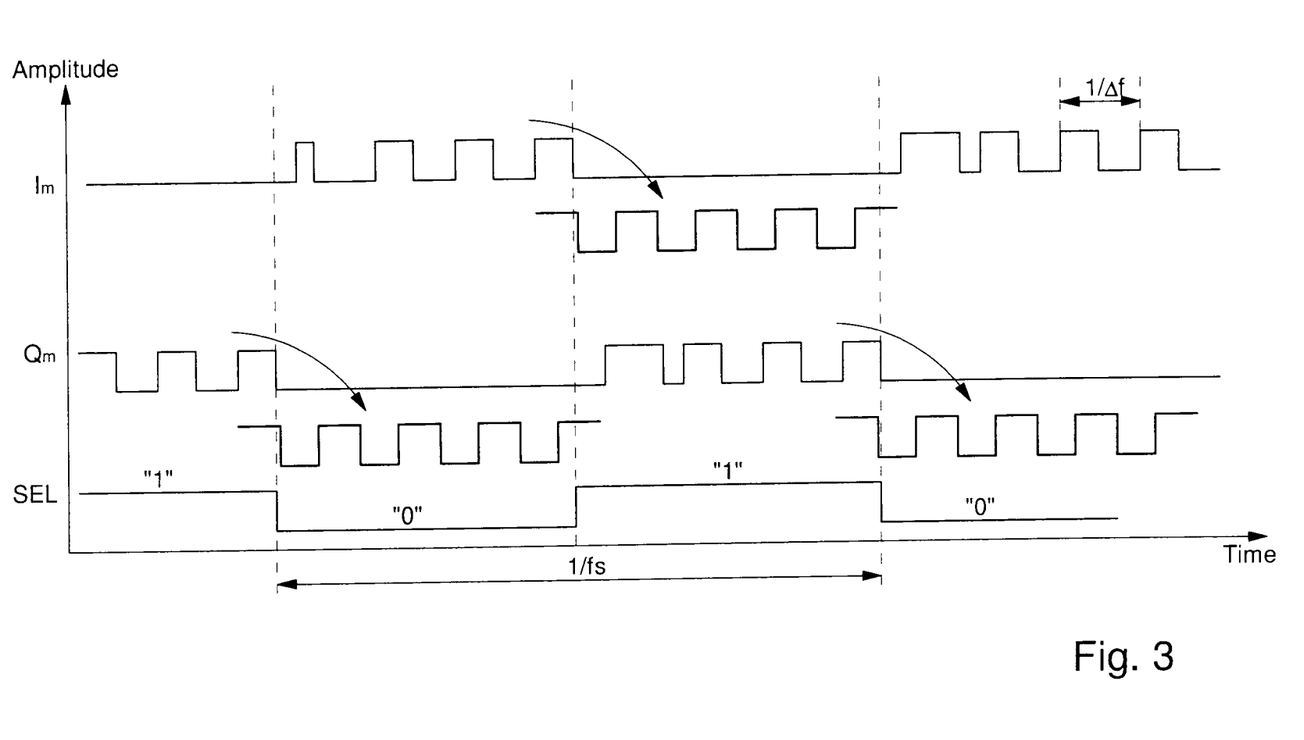
FIG. 3 shows a temporal graph of the intermediate in-phase and quadrature signals with the phase selection signal through the demodulation stage of the FSK radio frequency signal receiver according to the invention.

FIG. 3 shows a simplified view of a temporal graph of the filtered intermediate in-phase and quadrature signals Im and Qm with the phase selection signal SEL through the demodulation stage of the FSK radio frequency signal receiver. It is to be noted that, in each semi-period of switching cycle 1/fs, there are "holes" in the signals Im or Qm, but as a result of each magic circuit, the image of these signals is reconstructed as indicated by each arrow below signals Im and Qm. The intermediate in-phase signals Im and Qm at the output of the magic circuits are thus uninterrupted for continuous data demodulation in the demodulator.

The second embodiment of the FSK radio frequency signal receiver 1 is shown in FIG. 2b. The only difference in this second embodiment compared to the first embodiment of the receiver of FIG. 2a described above, is that the phase shift circuit 26 is placed on the path of the FSK radio frequency signals picked up by antenna 2. This phase shift circuit 26 is arranged between the LNA 3 and the single mixer 4. The phase shift circuit is clocked by the phase selection signal SEL so as to produce in-phase FSK radio frequency signals and quadrature FSK radio frequency signals alternately in each successive phase switching cycle. These in-phase and quadrature FSK signals are frequency converted in mixer 4 via the oscillating signals LO, supplied by the local oscillator 7, to produce intermediate baseband signals INT. These intermediate signals INT alternately include intermediate in-phase signals and intermediate quadrature signals. These intermediate signals INT are processed in the demodulation stage 20 in the same way as in the first embodiment of receiver 1, as described above with reference to FIG. 2a.

For the first and second embodiments of the FSK radio frequency signal receiver of FIGS. 2a and 2b, the phase selection signal SEL may advantageously be obtained by a programmable or multi-mode frequency divider connected to a reference quartz oscillator of local oscillator 7. The clock frequency for clocking magic circuits 14 and 15 may also be supplied by the quartz oscillator of the local oscillator. This local oscillator 7 may be a conventional frequency synthesiser. This synthesiser includes the reference quartz oscillator, which generates a reference frequency for a phase and frequency detector. This controls a VCO in the synthesiser PLL which generates the oscillating signals LO for the mixing operation in the single mixer 4. A programmable divider between the output of the VCO and the phase and frequency detector determines the frequency $f_0$ of oscillating signals LO.

Due to the low frequency of the switching cycle fs of the phase selection signal SEL, it is possible for the FSK signal receiver to have a standard structure. A single branch is used with a single frequency conversion mixer 4, which reduces electric power consumption compared to a state of the art receiver. Moreover, as indicated above, the sensitivity of this type of receiver is, to within −3 dB, substantially the same as that of a conventional receiver with two frequency conversion branches for the FSK signals.

Figure 4A:
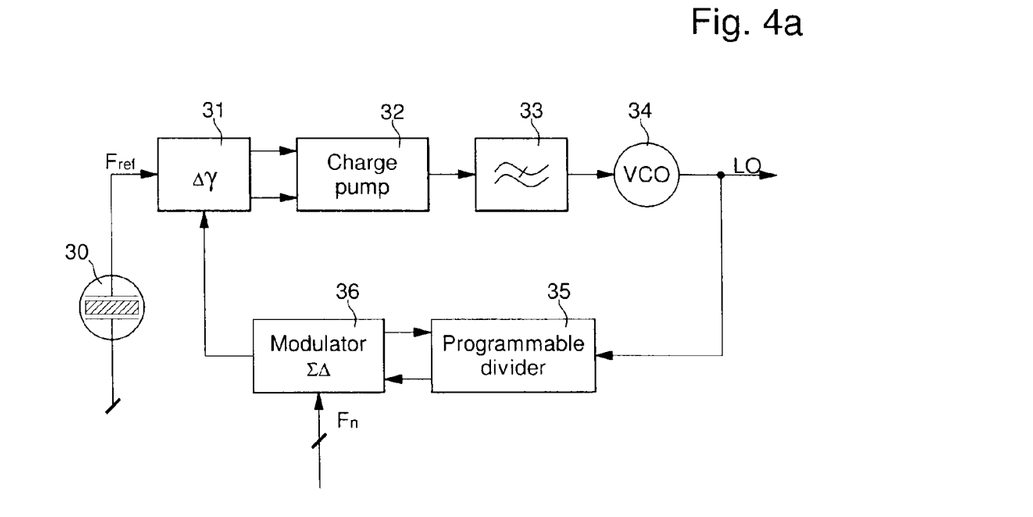
FIG. 4a shows a first simplified embodiment of a frequency synthesiser using sigma-delta synthesis, which forms the local oscillator with the integrated phase shifter of the FSK radio frequency signal receiver of FIG. 2a, FIG. 4b shows two temporal graphs illustrating phase switching by frequency programming via a binary word provided to the sigma-delta modulator of the synthesiser of FIG. 4a for the FSK radio frequency signal receiver of FIG. 2a, FIG. 5 shows a second simplified embodiment of a frequency synthesiser with two switchable delay units, which forms the local oscillator with the integrated phase shifter of the FSK radio frequency signal receiver of FIG. 2a, FIG. 6 shows a third simplified embodiment of a frequency synthesiser with two switchable delay units, which forms the local oscillator with the integrated phase shifter of the FSK radio frequency signal receiver of FIG. 2a, and FIG. 7 shows an embodiment of a phase shifter, which is arranged at the input of the FSK radio frequency signal receiver of FIG. 2b.

FIG. 4a describes a first simplified embodiment of a local oscillator, which integrates the phase shift circuit for the FSK radio frequency signal receiver of FIG. 2a. This local oscillator is preferably a frequency synthesiser which acts using sigma-delta synthesis.

This frequency synthesiser thus includes the quartz reference oscillator 30 able to provide a reference frequency signal Fref to a phase and frequency detector 31 in a PLL. Frequency Fref may be around 26 MHz. In the PLL, this phase and frequency detector 31 also receives divided frequency signals. These divided frequency signals come from oscillating signals LO supplied at the output of a VCO 34, which are frequency divided by a programmable divider 35. The division factor of divider 35 is programmed by a conventional sigma-delta modulator 36.

This frequency synthesiser also includes a charge pump 32, which receives the comparison signals from the phase and frequency detector, a low-pass filter 33 for filtering the signals supplied at the charge pump output, and the VCO 34. This VCO 34 is controlled by a determined voltage supplied at the output of the low-pass filter 33, in order to generate oscillating signals at a determined frequency. This determined frequency may be, for example, frequency $f_0$ which matches the carrier frequency of the incoming FSK radio frequency signals.

As a function of a binary programming word Fn from the sigma-delta modulator 36, this first embodiment of the frequency synthesiser can generate the oscillating signals LO at a determined frequency $f_0$ at the frequency synthesiser output. Via specific time programming of the sigma-delta modulator 36, it is possible to perform a 90° phase shift so as to change the in-phase oscillating signals into quadrature signals at the output of VCO 34. The reverse shift of −90° may also be performed to change quadrature oscillating signals into in-phase oscillating signals.

Figure 4B:
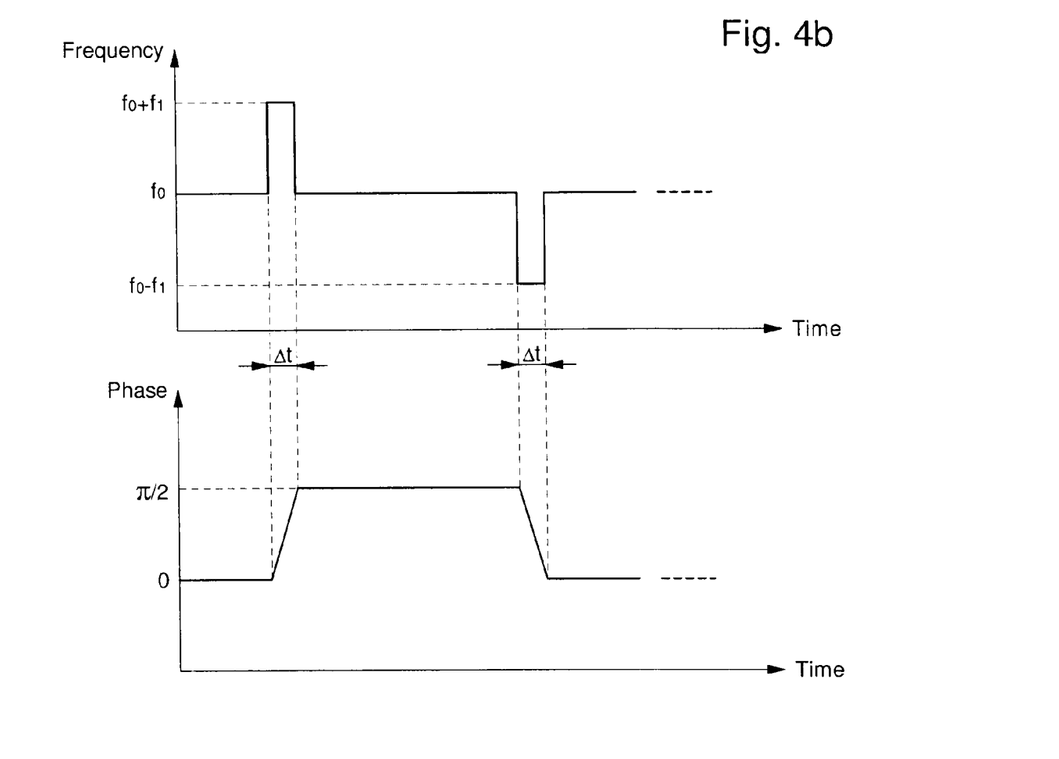

As also shown in the simplified graph of FIG. 4b, to change in-phase oscillating signals into quadrature oscillating signals, modulator 36 is programmed by a particular first binary word Fn. According to this first binary word, the desired frequency of oscillating signals LO is equal to the addition of frequency $f_0$ to a low complementary frequency $f_1$ for a period Δt. At the end of this period Δt, the modulator is programmed again by a basic binary word Fn to obtain frequency $f_0$ again in oscillating signals LO. During this period Δt, a 90° phase shift has been performed to change the in-phase oscillating signals into quadrature oscillating signals at the output of VCO 34. To perform this phase switching, when it changes from the "0" state to the "1" state, the phase selection signal (not shown) supplies the first binary word Fn to modulator 36.

To change the quadrature oscillating signals to in-phase oscillating signals, the modulator is programmed by a second specific binary word Fn. As a function of this second binary word, the desired frequency of the oscillating signals is equal to low complementary frequency $f_1$, subtracted from frequency $f_0$ in a period Δt. At the end of this period Δt, the modulator is programmed again by a basic binary word Fn to obtain frequency $f_0$ again in oscillating signals LO. During this period Δt, the oscillating signal phase shift changes by 90° again to 0° to supply in-phase oscillating signals at the VCO output. To perform this phase switching, when it changes from the "1" state to the "0" state, for example, the phase selection signal (not shown) supplies the second binary word Fn to modulator 36. Since this phase shift method is well known, no additional details will be given. It should just be noted that with this type of frequency synthesiser, the phase shift circuit is advantageously integrated in the local oscillator.

It should also be noted that, instead of providing first and second binary words Fn to sigma-delta modulator 36 during short periods Δt, it is also possible to envisage placing a multiplexer at the synthesiser output. The multiplexer input (not shown) receives in-phase and quadrature oscillating signals supplied by a differential type VCO. This multiplexer may advantageously be controlled by the phase selection signal SEL to supply at output either in-phase oscillating signals, or quadrature oscillating signals.

Figure 5:
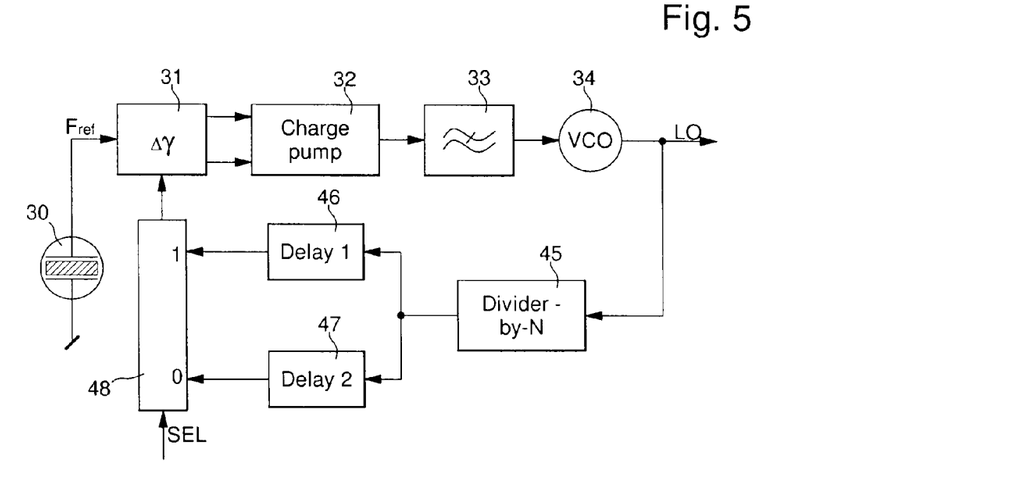

FIG. 5 describes a second simplified embodiment of a local oscillator, which integrates the phase shift circuit for the FSK radio frequency signal receiver of FIG. 2a. This local oscillator is preferably a frequency synthesiser with two delay units 46 and 47 that can be switched by phase selection signal SEL. Since several components of the frequency synthesiser of this second embodiment are identical to those described with reference to FIG. 4a, for the sake of simplicity, the description thereof will not be repeated.

The difference between this second embodiment of the frequency synthesiser and the first embodiment described above with reference to FIG. 4a is thus that two switchable delay units 46 and 47 are used instead of the sigma-delta modulator. The oscillating signals LO generated by VCO 34 are divided in a standard divider-by-N or a multi-mode divider 45 as desired, before the divided signals are directed to the input of the first delay unit 46 and the second delay unit 47. The output of each delay unit is connected to the input of a multiplexer 48, wherein the divided output signals of multiplexer 48 are provided to the phase and frequency detector 31. Phase selection signal SEL makes a selection of divided signals to be supplied at output in multiplexer 48. During a first semi-period of a phase switching cycle 1/fs, the divided "in-phase" signals are supplied to detector 31 to perform a comparison with the reference signal Fref. During a second successive semi-period of the phase switching cycle, the divided "quadrature" signals are supplied to detector 31. Thus, in each switching cycle, the VCO 34 alternately and successively generates at output in-phase oscillating and quadrature signals LO.

Each delay unit 46, 47 may be achieved by placing an inverter and voltage controlled delay transmission gate in series. This voltage is controlled to create the necessary delay to be supplied to detector 31. The delay may be controlled by series-connecting m inverters followed by m variable control voltage transmission gates. This therefore forms a ring oscillator, phase locked onto a reference frequency Fref, for example generated by quartz oscillator 30. In the second delay control unit 47 the ring oscillator includes n inverters, followed by n variable voltage controlled transmission gates, which are phase locked onto reference frequency Fref. The difference in delay between the components of the two delay units is set precisely by the formula $((1/Fref)/m)-((1/Fref)/n)$. In the event that m is equal to 37 and n is equal to 31, with a reference frequency Fref equal to 26 MHz, the delay difference is around 100 ps. In the case of a frequency $f_0$ of 2.45 GHZ in oscillating signals LO, the time difference in the divided signals supplied by the delay units is thus around 100 ps.

Figure 6:
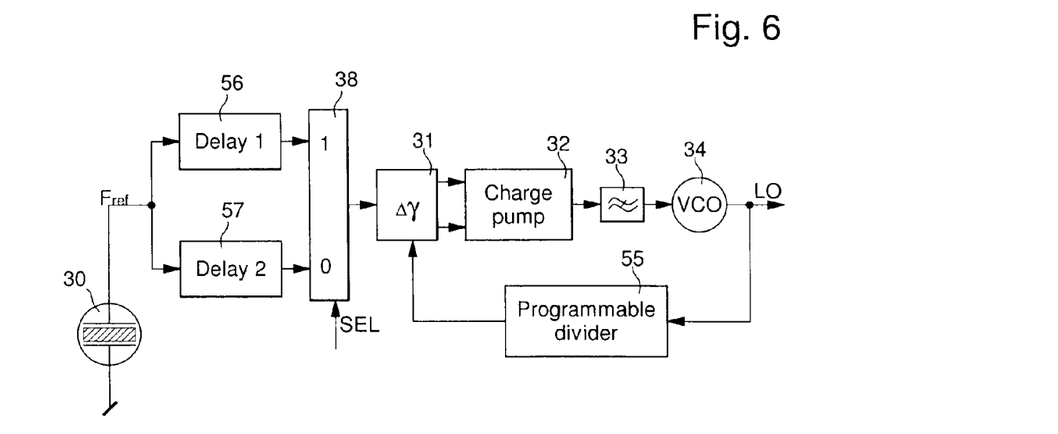

FIG. 6 describes a third simplified embodiment of a local oscillator, which integrates the phase shift circuit for the FSK radio frequency signal receiver of FIG. 2a. This local oscillator is preferably a frequency synthesiser with two delay units 56 and 57 that can be switched by phase selection signal SEL. Since several components of the frequency synthesiser of this third embodiment are identical to those described with reference to FIGS. 4a and 5, for the sake of simplicity, the description thereof will not be repeated.

This third embodiment of the frequency synthesiser is very similar to the second embodiment shown in FIG. 5. In this third embodiment, the two delay units 56, 57 are arranged this time between the reference oscillator 30 and the phase and frequency detector 31. The oscillating signals LO generated by VCO 34 are only divided by the programmable or multi-mode divider 55. This programmable divider 55 supplies divided signals to the phase and frequency detector 31 in the PLL.

Each delay unit 56 and 57 receives reference signal Fref. The output of each delay unit is connected to the input of a multiplexer 58 so that the reference signal Fref at the output of multiplexer 58 is supplied to the phase and frequency detector 31. One of the delay units, which must supply the reference signal to detector 31, is selected in multiplexer 58 via the phase selection signal SEL. During a first semi-period of a phase switching cycle 1/fs, the "in-phase" reference signal is supplied to detector 31 to carry out the comparison with the divided signals from programmable divider 55. During a second successive semi-period of the phase switching cycle, the "quadrature" reference signal is supplied to detector 31. Thus, in each switching cycle, the VCO 34 alternately and successively generates at output in-phase oscillating and quadrature signals LO.

As in the second embodiment, the delay units 56, 57 of this third embodiment are similar to the units 46 and 47 described above. The description of these delay units 56 and 57 will not therefore be repeated.

It should also be noted that in addition to all the frequency synthesiser embodiments described with reference to FIGS. 4a, 5 and 6, it is possible to envisage the VCO first of all supplying in-phase oscillating or quadrature signals, whose frequency still has to be adapted to that of the incoming radio frequency signals. In a first variant, the VCO 34 may generate oscillating signals, whose frequency is half the frequency $f_0$ of the FSK radio frequency signals. In this case, a frequency doubler must be placed at the VCO output. With a 45° phase shift at the VCO output, a 90° phase shift may be obtained at the doubler output. In a second variant, the VCO may generate oscillating signals, whose frequency is twice that of the FSK radio frequency signals. In this case, a divider-by-two is provided at the VCO output. With a 180° phase shift at the VCO output, this means a 90° phase shift at the divider-by-two output.

Figure 7:
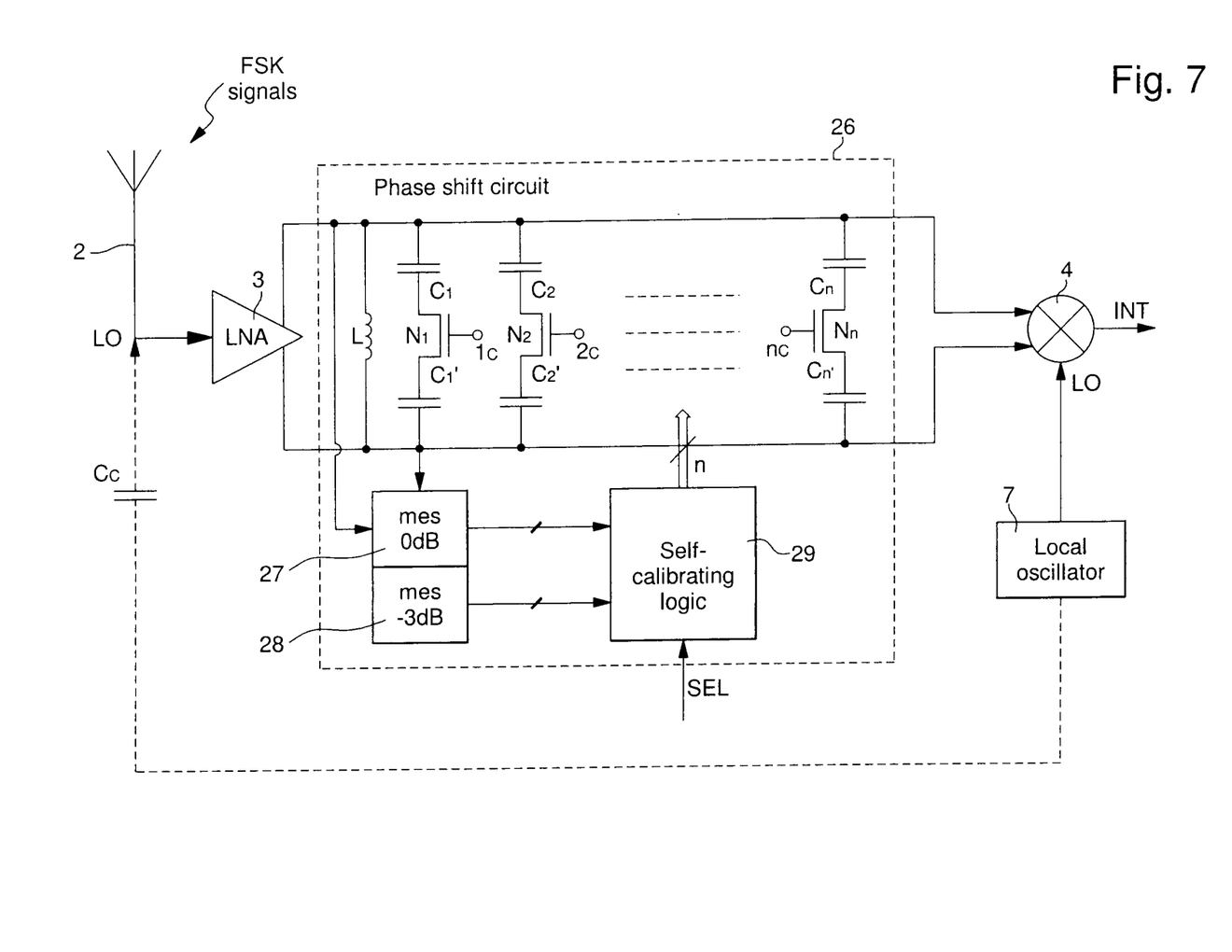

FIG. 7 shows an embodiment of a phase shift circuit 26, which is arranged at the input of the FSK radio frequency signal receiver in the second embodiment shown in FIG. 2b. Only the input part of the receiver is shown in FIG. 7.

The phase shift circuit 26 mainly includes an array of switchable capacitors in a differential connection. This array of switchable capacitors is placed in parallel to an inductor L and antenna 2 via LNA 3 to form a resonant circuit. As explained below, this resonant circuit must be calibrated so that the FSK radio frequency signals picked up by the antenna are alternately, in each successive phase switching cycle, in-phase FSK radio frequency signals and quadrature FSK radio frequency signals. A phase selection signal SEL is applied to this phase shift circuit 26 to perform the phase switching in the resonant circuit.

Since this array of switchable capacitors is of the differential type, the LNA 3 has two outputs in phase opposition. The array of switchable capacitors is thus connected to the two outputs of LNA 3 and to a dual input of the single mixer 4. The array of switchable capacitors thus includes n capacitive groups in parallel, connected to the two output lines of LNA 3. Each capacitive group includes two capacitors C1, C1', C2, C2', Cn, Cn' and one switch, such as a MOS transistor N1, N2, Nm series-connected between the two capacitors. The MOS transistors are preferably of the NMOS type. The capacitive value of each pair of capacitors of the array is weighted to the power of 2. To select one pair of capacitors or another from a capacitive group to be placed in parallel to inductor L, the NMOS transistors N1, N2 to Nm are controlled across the gate 1c, 2c to nc thereof to make said transistors conductive via an n bit configuration word, which is supplied by a self-calibrating logic circuit 29.

In a first phase, the resonant circuit must be calibrated with the array of switchable capacitors. This is achieved by basing the switchable phase shift circuit 26 on a property which links the amplitude and phase of the parallel resonant circuit. This requires precise determination of the two points located at −3 dB from the maximum resonance gain. These two points, which are at −3 dB from the maximum gain, have a phase difference of exactly 90°. Moreover, this difference is relatively constant with frequency within the bandwidth limits as a function of the quality factor of the FSK radio frequency signal receiver. The resonant circuit, which is formed of capacitive groups, simply needs to be calibrated as a function of two binary words alternately transmitted by the self-calibrating logic circuit 29 according to the phase selection signal, which controls the self-calibrating logic circuit. As a result of these two binary words, alternately transmitted to the array of switchable capacitors, the phase shift circuit alternately supplies in-phase radio frequency signals and quadrature radio frequency signals to mixer 4.

This calibration occurs by injecting and measuring test oscillating signals LO. These oscillating test signals LO are provided by local oscillator 7 to the input of LNA 3, in particular via a capacitor Cc. Of course, once the array of switchable capacitors has been calibrated, the local oscillator no longer supplies the oscillating test signals LO to the LNA 3 input. A switch (not shown) may be provided for this purpose between the local oscillator output and the LNA 3 input before capacitor Cc. Other oscillating signals LO from local oscillator 7, which is preferably a frequency synthesiser, are supplied directly to mixer 4 for the frequency conversion of the FSK radio frequency signals into intermediate baseband signals INT. For this direct conversion, the oscillating signal frequency is set to be identical to the frequency $f_0$ of the incoming FSK radio frequency signals.

To perform the amplitude measurement, there is first provided a first measuring circuit 27, which is connected to both LNA 3 outputs and to the array of switchable capacitors. The purpose of this first measuring circuit 27 is to determine the maximum gain point via self-calibrating logic circuit 29. This self-calibrating logic circuit successively makes a certain number of NMOS transistors conductive so as to place one or several pairs of capacitors of the capacitive groups in parallel until the first measuring circuit determines the maximum gain. Once the maximum gain has been determined, a second measuring circuit 28, in parallel to the first measuring circuit 27, receives the signals attenuated by −3 dB, for example using an attenuator, such as a capacitive divider. A comparison is made between the second measuring circuit measurements and the first measuring circuit measurement. This allows the two −3 dB points from the maximum gain to be determined, so that self-calibrating logic circuit 29 successively supplies the two binary calibration words to the array of switchable capacitors.

It should be noted that at least the first measuring circuit 27 can be configured to perform an improved Bessel amplitude measurement, which is well known. This is achieved by using the exponential characteristic of a weak inversion MOS transistor with coupling of the FSK radio frequency signals to be measured. The exponential of a sinus function is the zeroth order Bessel function, whose output voltage value decreases when the amplitude of the coupled FSK radio frequency signals increases. To obtain a greater variation as a function of amplitude, a well-known improved Bessel detector couples two similar behaviours by placing two complementary NMOS and PMOS transistors and a current source in series between two terminals of a voltage supply source. An output voltage signal is supplied to the PMOS transistor source, which is connected to the current source. This detector has a differential configuration so as to take advantage of the associated virtual mass.

The FSK radio frequency signal receiver 1 described above includes an integrated circuit in which most of the receiver components are integrated. This integrated circuit may be made in 0.18 μm CMOS technology for example.

From the description that has just been given, several variants of the FSK radio frequency signal receiver can be devised by those skilled in the art without departing from the scope of the invention defined by the claims. The phase shift circuit may be arranged between the antenna and the low noise amplifier. The array of switchable capacitors of the phase shift circuit may be formed of capacitive groups with a single capacitor in series with a bipolar or MOS transistor, which are connected between a single output line of the LNA and an earth terminal. This array of switchable capacitors may also be directly connected to the antenna.

What is claimed is:

1. A low rate radio frequency signal receiver for frequency shift key (FSK) modulation, said low rate receiver including:
   an antenna to receive FSK radio frequency signals,
   a low noise amplifier to amplify and filter the signals picked up by the antenna,
   a local oscillator to supply oscillating signals having a substantially identical frequency to the carrier frequency of the incoming FSK radio frequency signals,
   a phase shift circuit to perform a 0° to 90° phase shift and vice versa in the oscillating signals or the incoming FSK radio frequency signals, in each semi-period of a phase switching cycle, so as to generate, alternately and successively, in-phase and quadrature oscillating signals, or in-phase and quadrature incoming FSK radio frequency signals,
   a mixer to successively mix the in-phase and quadrature oscillating signals with the amplified and filtered incoming FSK radio frequency signals, or the oscillating signals with the in-phase and quadrature FSK radio frequency signals, so as to generate alternately intermediate in-phase and quadrature baseband signals,
   at least one low-pass filter to filter the intermediate in-phase and quadrature baseband signals, and
   a demodulation stage to demodulate data from the filtered intermediate in-phase and quadrature baseband signals,
   wherein the receiver is arranged such that the phase shift circuit is switched by a phase selection signal to a phase switching cycle frequency which is lower than a frequency deviation of the modulated data in the FSK radio frequency signals and higher than a frequency of a modulated data rate, and
   wherein the demodulation stage input includes a demultiplexer to receive the filtered intermediate in-phase and quadrature signals, said demultiplexer being controlled by the phase selection signal so as to supply cyclically the filtered intermediate in-phase signals at a first output and the filtered intermediate quadrature signals at a second output, and a data demodulator receiving the filtered intermediate in-phase and quadrature signals from the demultiplexer, to supply data signals.

2. The receiver according to claim 1, wherein the receiver is arranged such that the phase shift circuit is switched by the phase selection signal to the phase switching cycle frequency which is between 10 and 20 times lower than the frequency deviation of the modulated data in the FSK radio frequency signals and between 10 and 20 times higher than the frequency of the modulated data rate.

3. The receiver according to claim 1, wherein the demodulation stage includes a first magic circuit between the first demultiplexer output and the demodulator, and a second magic circuit between the second demultiplexer output and the demodulator, each magic circuit including a pseudo digital phase lock loop to continuously generate the in-phase or quadrature signals so as to reconstruct the intermediate in-phase or quadrature signals following any interruption due to phase switching in the demultiplexer by the phase selection signal.

4. The receiver according to claim 3, wherein each magic circuit includes a counter to measure the period of the selected filtered intermediate signals, and a digital phase lock loop, which is frequency adjusted once per switching operation with a phase equal to the mean phase measured during the duration of the filtered intermediate signals prior to any interruption due to the phase switch, so as to generate continuously, after interruption, intermediate in-phase or quadrature signals to be supplied to the demodulator for continuous demodulation of the filtered intermediate in-phase and quadrature signals from the two magic circuits.

5. The receiver according to claim 1, wherein the demodulator is a data or delay (D) flip-flop to receive the filtered intermediate in-phase or quadrature signals at one input, and being clocked by the other filtered intermediate quadrature or in-phase signals.

6. The receiver according to claim 1, wherein the phase shift circuit is integrated in the local oscillator, which is a frequency synthesiser, so as to supply alternately and successively in-phase and quadrature oscillating signals.

7. The receiver according to claim 6, wherein the frequency synthesiser includes a quartz reference oscillator able to supply a reference frequency signal to a phase and frequency detector in a phase lock loop, which includes a charge pump connected to the phase and frequency detector output, and the phase lock loop further includes a low-pass filter, a voltage controlled oscillator receiving filtered signals of the low-pass filter of the phase lock loop to generate voltage controlled oscillating signals, a programmable or multi-mode divider to frequency divide the voltage controlled oscillating signals in conjunction with a sigma-delta modulator, so as to supply divided signals to the phase and frequency detector, the sigma-delta modulator being programmed by binary words in each phase switching cycle, such that the voltage controlled oscillator alternately and successively supplies in-phase and quadrature oscillating signals.

8. The receiver according to claim 6, wherein the frequency synthesiser includes a quartz reference oscillator able to supply a reference frequency signal to a phase and frequency detector in a phase lock loop, which includes a charge pump connected to the detector output, a low-pass filter, a voltage controlled oscillator receiving the filtered signals to generate the oscillating signals, a multi-mode divider or divider-by-N, where N is a division factor, to frequency divide the oscillating signals, two delay units receiving the divided signals from the divider and a multiplexer connected to the two delay units and controlled by the phase selection signal, so as to supply the divided signals alternately via the first delay unit and the second delay unit to the phase and frequency detector, such that the voltage controlled oscillator alternately and successively generates in-phase and quadrature oscillating signals.

9. The receiver according to claim 6, wherein the frequency synthesiser includes a quartz reference oscillator able to supply a reference frequency signal to two delay units, said delay units being connected to a multiplexer controlled by the phase selection signal so as to supply the reference signal alternately via the first delay unit and the second delay unit to a phase and frequency detector in a phase lock loop, which includes a charge pump connected to the detector output, a low-pass filter, a voltage controlled oscillator receiving the filtered signals to generate alternately in-phase and quadrature oscillating signals, a divider-by-N, where N is a division factor, or multi-mode divider to frequency divide the oscillating signals and supply divided signals to the phase and frequency detector.

10. The receiver according to claim 1, wherein the phase shift circuit is arranged between the low noise amplifier and the mixer.

11. The receiver according to claim 10, wherein the phase shift circuit includes an array of switchable capacitors arranged in parallel with an inductor and the antenna via the low noise amplifier to define a resonant circuit, a self-calibrating logic circuit controlled by the phase selection signal to alternately supply two binary configuration words to the array of switchable capacitors for the supply of in-phase radio frequency signals and quadrature radio frequency signals to the mixer.

12. The receiver according to claim 11, wherein the phase shift circuit includes a first measuring circuit to determine the maximum gain point of the resonant circuit via the self-calibrating logic circuit, and a second measuring circuit to determine two points attenuated by −3 dB relative to the maximum gain point, so as to configure the self-calibrating logic circuit, which alternately and successively supplies two configuration words to the array of switchable capacitors to perform a 0° to 90° phase shift, and vice versa, in the incoming FSK radio frequency signals.

13. The receiver according to claim 12, wherein the local oscillator is arranged to supply oscillating signals to the low noise amplifier input during a calibration period for calibrating the array of switchable capacitors.

14. A low rate radio frequency signal receiver for frequency shift key (FSK) modulation, said low rate receiver including:
an antenna to receive FSK radio frequency signals,
a low noise amplifier to amplify and filter the signals picked up by the antenna,
a local oscillator to supply oscillating signals having a substantially identical frequency to the carrier frequency of the incoming FSK radio frequency signals,
a phase shift circuit to perform a 0° to 90° phase shift and vice versa in the oscillating signals or the incoming FSK radio frequency signals, in each semi-period of a phase switching cycle, so as to generate, alternately and successively, in-phase and quadrature oscillating signals, or in-phase and quadrature incoming FSK radio frequency signals,
a mixer to successively mix the in-phase and quadrature oscillating signals with the amplified and filtered incoming FSK radio frequency signals, or the oscillating signals with the in-phase and quadrature FSK radio frequency signals, so as to generate alternately intermediate in-phase and quadrature baseband signals,
at least one low-pass filter to filter the intermediate in-phase and quadrature baseband signals, and
a demodulation stage to demodulate data from the filtered intermediate in-phase and quadrature baseband signals,
wherein the receiver is arranged such that the phase shift circuit is switched by a phase selection signal to a phase switching cycle frequency which is lower than a frequency deviation of the modulated data in the FSK radio frequency signals and higher than a frequency of a modulated data rate,
wherein the phase shift circuit is integrated in the local oscillator, which is a frequency synthesiser, so as to supply alternately and successively in-phase and quadrature oscillating signals, and
wherein the frequency synthesiser includes a quartz reference oscillator able to supply a reference frequency signal to a phase and frequency detector in a phase lock loop, which includes a charge pump connected to the phase and frequency detector output, and the phase lock loop further includes a low-pass filter, a voltage controlled oscillator receiving filtered signals of the low-pass filter of the phase lock loop to generate voltage controlled oscillating signals, a programmable or multi-mode divider to frequency divide the voltage controlled oscillating signals in conjunction with a sigma-delta modulator, so as to supply divided signals to the phase and frequency detector, the sigma-delta modulator being programmed by binary words in each phase switching cycle, such that the voltage controlled oscillator alternately and successively supplies in-phase and quadrature oscillating signals.

15. A low rate radio frequency signal receiver for frequency shift key (FSK) modulation, said low rate receiver including:
an antenna to receive FSK radio frequency signals,
a low noise amplifier to amplify and filter the signals picked up by the antenna,
a local oscillator to supply oscillating signals having a substantially identical frequency to the carrier frequency of the incoming FSK radio frequency signals,
a phase shift circuit to perform a 0° to 90° phase shift and vice versa in the oscillating signals or the incoming FSK radio frequency signals, in each semi-period of a phase switching cycle, so as to generate, alternately and successively, in-phase and quadrature oscillating signals, or in-phase and quadrature incoming FSK radio frequency signals, a mixer to successively mix the in-phase and quadrature oscillating signals with the amplified and filtered incoming FSK radio frequency signals, or the oscillating signals with the in-phase and quadrature FSK radio frequency signals, so as to generate alternately intermediate in-phase and quadrature baseband signals, at least one low-pass filter to filter the intermediate in-phase and quadrature baseband signals, and a demodulation stage to demodulate data from the filtered intermediate in-phase and quadrature baseband signals, wherein the receiver is arranged such that the phase shift circuit is switched by a phase selection signal to a phase switching cycle frequency which is lower than a frequency deviation of the modulated data in the FSK radio frequency signals and higher than a frequency of a modulated data rate, wherein the phase shift circuit is arranged between the low noise amplifier and the mixer, and wherein the phase shift circuit includes an array of switchable capacitors arranged in parallel with an inductor and the antenna via the low noise amplifier to define a resonant circuit, a self-calibrating logic circuit controlled by the phase selection signal to alternately supply two binary configuration words to the array of switchable capacitors for the supply of in-phase radio frequency signals and quadrature radio frequency signals to the mixer.

16. The receiver according to claim 15, wherein the phase shift circuit includes a first measuring circuit to determine the maximum gain point of the resonant circuit via the self-calibrating logic circuit, and a second measuring circuit to determine two points attenuated by −3 dB relative to the maximum gain point, so as to configure the self-calibrating logic circuit, which alternately and successively supplies two configuration words to the array of switchable capacitors to perform a 0° to 90° phase shift, and vice versa, in the incoming FSK radio frequency signals.

17. The receiver according to claim 16, wherein the local oscillator is arranged to supply oscillating signals to the low noise amplifier input during a calibration period for calibrating the array of switchable capacitors.

* * * * *